US012466708B1

(12) United States Patent
Tieman

(10) Patent No.: US 12,466,708 B1
(45) Date of Patent: Nov. 11, 2025

(54) INSTALLATION TOOL FOR A DISPLAY AND METHOD OF USE

(71) Applicant: Michael Anthony Tieman, Las Vegas, NV (US)

(72) Inventor: Michael Anthony Tieman, Las Vegas, NV (US)

( * ) Notice: Subject to any disclaimer, the term of this patent is extended or adjusted under 35 U.S.C. 154(b) by 349 days.

(21) Appl. No.: 18/107,748

(22) Filed: Feb. 9, 2023

(51) Int. Cl.
*B66F 3/18* (2006.01)

(52) U.S. Cl.
CPC ............ *B66F 3/18* (2013.01); *B66F 2700/04* (2013.01)

(58) Field of Classification Search
CPC ......... F16M 11/18; B66F 3/18; B66F 2700/04
See application file for complete search history.

(56) References Cited

U.S. PATENT DOCUMENTS 5,286,003 A * 2/1994 Chuang ..................... B66F 3/18 254/103
7,044,423 B2 * 5/2006 Bober .................... F16M 11/18 248/188.4
9,233,699 B2 * 1/2016 Murphy .................... B62B 1/14
9,834,421 B2 * 12/2017 Raper, Jr. .................. B66F 5/02
2001/0038786 A1 * 11/2001 Kim ........................ B62B 1/002 414/490
2006/0238086 A1 * 10/2006 Lai ..................... A47B 21/0073 312/319.5
2009/0057501 A1 * 3/2009 Huang ................... F16M 11/22 248/157
2019/0203875 A1 * 7/2019 Yu .......................... F16M 11/42

* cited by examiner

*Primary Examiner* — Seahee Hong
(74) *Attorney, Agent, or Firm* — Ted Masters

(57) ABSTRACT

An installation tool for mounting a display on a wall having a wall mount includes a first leg and a second leg disposed in parallel relationship with the first leg. A crossbar is slidably connected to the first leg and the second leg. A holder is configured to accept the display, the holder slidably connected to the first leg and the second leg. A threaded rod includes a connector for engaging the cross bar. A lifter is configured to lift the holder, the lifter positionable along the threaded rod. The display if installed in the installation tool and lifted to a vertical position where it can be connected to the wall mount.

18 Claims, 14 Drawing Sheets

FIG. 1
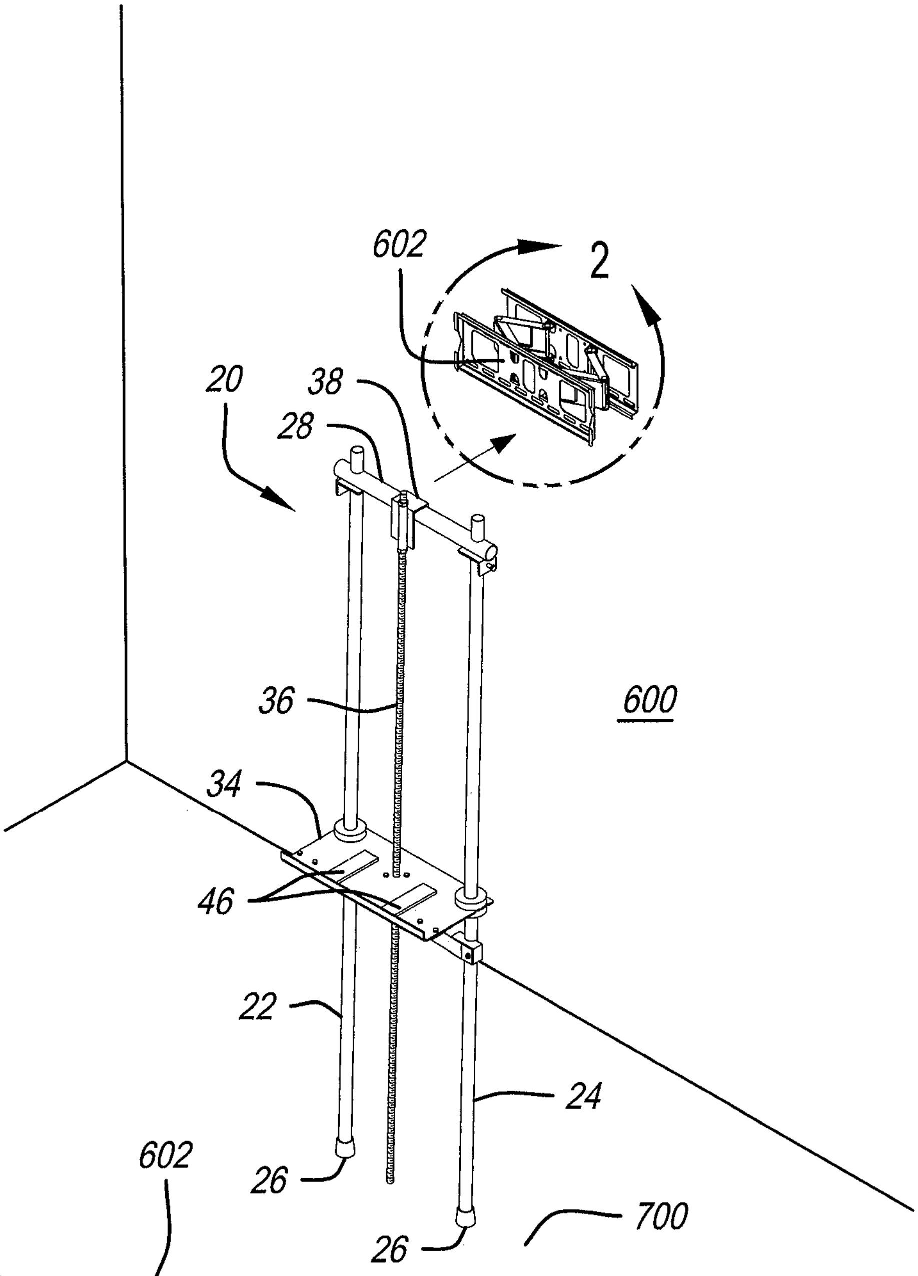
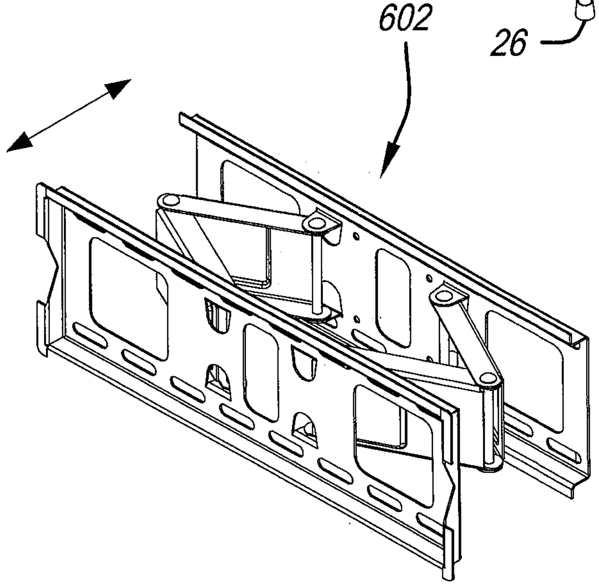
FIG. 2

INSTALLATION TOOL FOR A DISPLAY AND METHOD OF USE

CROSS REFERENCE TO RELATED APPLICATION

None.

TECHNICAL FIELD

The present invention pertains generally to wall-mounted displays, and more particularly to an installation tool for facilitating the connection of the display to a wall mount.

BACKGROUND OF THE INVENTION

Wall-mounted displays are well known in the art. These displays are generally flat and are connected to a wall mount positioned on a wall. The display must be lifted up to align with the wall mount, and then must be connected to the wall mount. Because of the weight and bulk of the display, this process presents a problem for a single person to implement.

BRIEF SUMMARY OF THE INVENTION

The present invention is directed to an installation tool for a display which facilitates the wall-mounted installation process, and makes it possible for a single person to effect the installation. The installation tool is positioned against the wall adjacent the wall mount. The display is then loaded into the holder of the installation tool. The display is then raised so that it's wall-facing connectors align with the wall mount, and the display can be connected thereto. The raising is accomplished by a lifter which urges the holder upward along the threaded rod. By using the installation tool, a single person can safely and easily connect the display to the wall mount in a short period of time.

In accordance with an embodiment, an installation tool for a display is disclosed, the display connectable to a wall mount which is connected to a wall. The installation tool includes a first leg, and a second leg disposed in parallel relationship with the first leg. A crossbar is slidably connected to the first leg and the second leg. A holder is configured to accept the display, the holder slidably connected to the first leg and the second leg. The installation tool further including a threaded rod. A connector is connected to the threaded rod, the connector engaging the cross bar. A lifter which is configured to lift the holder, the lifter positionable along the threaded rod.

In accordance with another embodiment, the display has a weight. In an in-use configuration the weight of the display is borne by the first leg and the second leg.

In accordance with another embodiment, a first stop is slidably connected to the first leg, the first stop abutting the crossbar and limiting downward motion thereof. A second stop is slidably connected to the second leg, the second stop abutting the crossbar and limiting downward motion thereof.

In accordance with another embodiment, the connector is positionable along the threaded rod.

In accordance with another embodiment, the holder includes a cushion which is configured to abut the display.

In accordance with another embodiment, the lifter including a worm gear which engages an internally threaded worm wheel which receives the threaded rod.

In accordance with another embodiment, the holder has a first semicircular groove which is shaped and dimensioned to receive the first leg, and the holder has a second semicircular groove which is shaped and dimensioned to receive the second leg.

Other embodiments, in addition to the embodiments enumerated above, will become apparent from the following detailed description, taken in conjunction with the accompanying drawings, which illustrate, by way of example, the principles of the installation tool for a display and method of use.

BRIEF DESCRIPTION OF THE DRAWINGS

FIG. 1 is a perspective view of an installation tool for a wall-mounted display;

FIG. 2 is an enlarged view of area 2 of FIG. 1;

DETAILED DESCRIPTION OF THE INVENTION

Figure 9:
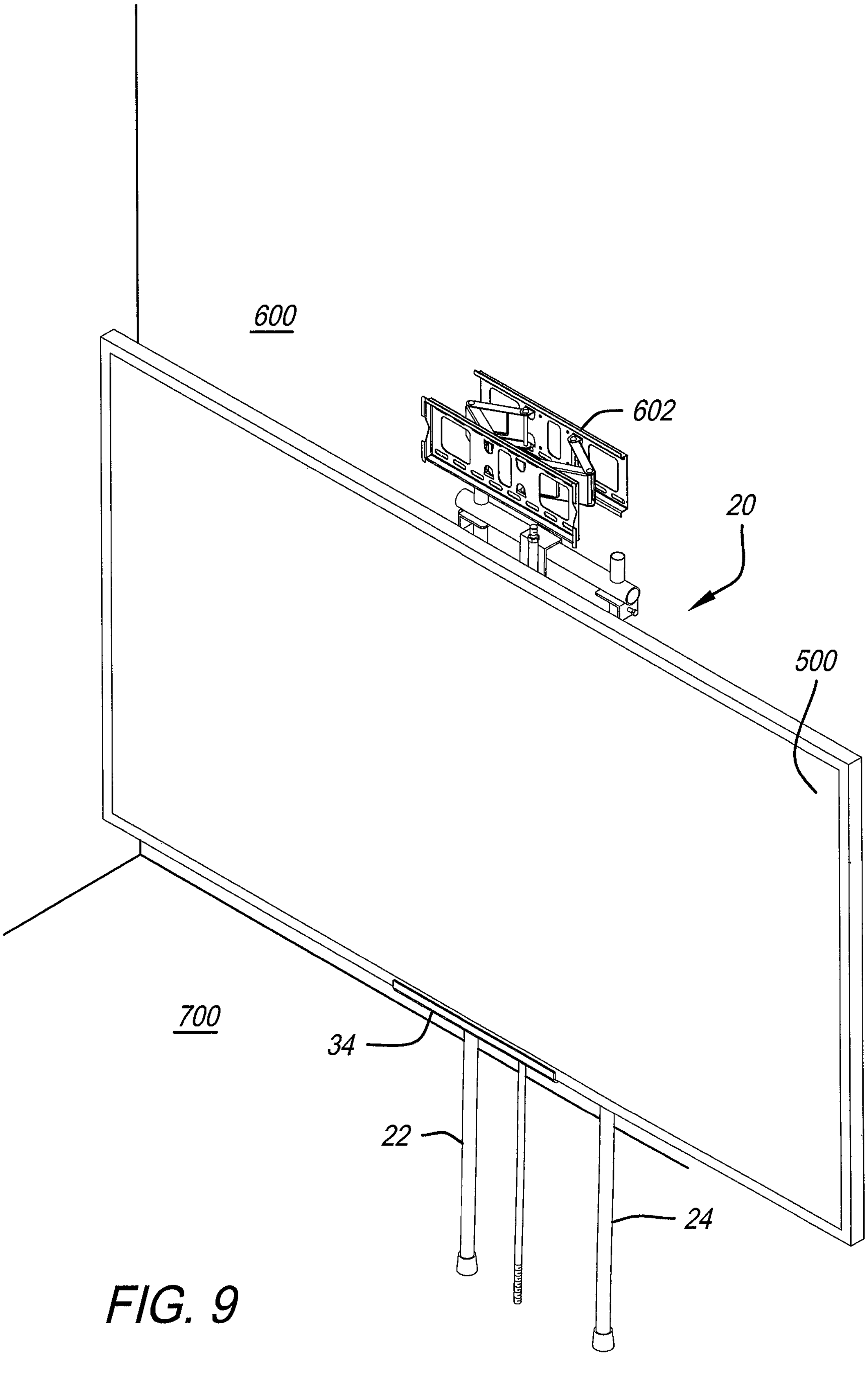
FIG. 9 is an enlarged perspective view of a display resting in the installation tool.

Referring initially to FIGS. 1-4 there are illustrated perspective, front elevation, and side elevation views of an installation tool 20 for a wall-mounted display 500 (refer to FIG. 9). Installation tool 20 is used to facilitate the connection of a display 500 (refer to FIG. 9-10) to a wall mount 602, the wall mount being 602 connected to a wall 600 which upwardly projects from a support surface 700 (such as a floor). In the shown embodiment wall mount 602 is articulated so that it can move away from and toward wall 600 (refer to arrows in FIG. 2). However, it may be appreciated that different types of wall mounts 602 could also be utilized. Display 500 embraces any electronic visual display which can be mounted on a wall, and which electronically receives and presents images. Flat screen LCD and LED displays are commonplace in today's technology, however other technology displays can also profit from the present installation tool 20. Moreover, display 500 can be an integrated unit which contains all TV and display-associated electronics, or just a monitor which cooperates with a remote electronic unit.

Installation tool 20 includes a first leg 22, and a second leg 24 which is disposed in parallel relationship with first leg 22. In the shown embodiment first leg 22 and second leg 24 are fabricated from straight metal tubing, and have cushioned feet 26 which rest upon support surface 700 (refer also to FIG. 8). A crossbar 28 is slidably connected to first leg 22 and second leg 24. In the shown embodiment crossbar 28 is a larger metal tube which has two through holes which accept first leg 22 and second leg 24. A first stop 30 is slidably connected to first leg 22. First stop 30 abuts crossbar 28 and limits downward motion (toward support surface 700) of crossbar 28. A second stop 32 is slidably connected to second leg 24. Second stop 32 abuts crossbar 28 and limits downward motion of crossbar 28. In the shown embodiment first stop 30 and second stop 32 include screws which engage first leg 22 and second leg 32 respectively. The position of crossbar along first leg 22 and second leg 24 can be is adjusted by loosening stop 30 and 32, moving crossbar 28 to a different vertical position, and re-tightening stops 30 and 32. For example, a different lower position of crossbar 28 is shown in broken lines on FIG. 3. Such adjustments of the position of crossbar 28 along first 22 and second 24 legs accommodate different heights of display 500 mounting.

Installation tool 20 further includes a lifter 40 which is configured to lift holder 34. Lifter 40 is positionable along threaded rod 36. Lifter 40 is used to move holder 34 and display 500 which it carries, up (away from support surface 700) along threaded rod 36. This is how display 500 is moved into position to engage wall mount 602 (refer to FIGS. 9-16). Lifter 40 can also be used to move holder 34 and display 500 down when removing a display from a wall. In the shown embodiment lifter 40 is connected to holder 34 and includes a worm gear assembly (refer to FIGS. 5 and 6 and the associated discussion. Other embodiment of lifter 40 are also possible (refer to FIG. 17 and the associated discussion). It is noted that threaded rod 36 does not rotate and connects holder 34 to hook 38 which in turn engages crossbar 28. During use, lifter 40 moves holder 34 and display 500 up along threaded rod 36.

Installation tool 20 further includes a threaded rod 36. A connector 38 (such as a hook) is threadably connected to threaded rod 36, and is positionable along threaded rod 36. Connector 38 engages (fits over) crossbar 28. A second possible position of connector 38 along first leg 22 and second leg 24 is shown in broken line in FIG. 4. Different positions of connector 38 along threaded rod 36 can be useful in accommodating different display installation needs. It may be appreciated that other types of connector 38 could be utilized to connect threaded rod 36 to crossbar 28.

Installation tool 20 further includes a lifter 40 which is configured to lift holder 34. Lifter 40 is positionable along threaded rod 36. Lifter 40 is used to move holder 34 and display 500 which it carries, up (away from support surface 700) along threaded rod 36. This how display 500 is moved into position to engage wall mount 602 (refer to FIGS. 9-16). Lifter 40 can also be used to move holder 34 and display 500 down when removing a display from a wall. In the shown embodiment lifter 40 is connected to holder 34 and includes a worm gear assembly (refer to FIGS. 5 and 6 and the associated discussion. Other embodiment of lifter 40 are also possible (refer to FIG. 17 and the associated discussion). It is noted that threaded rod 36 does not rotate and connects holder 34 to hook 38 which in turn engages crossbar 28. During use, lifter 40 moves holder 34 and display 500 up along threaded rod 36.

Figure 3:
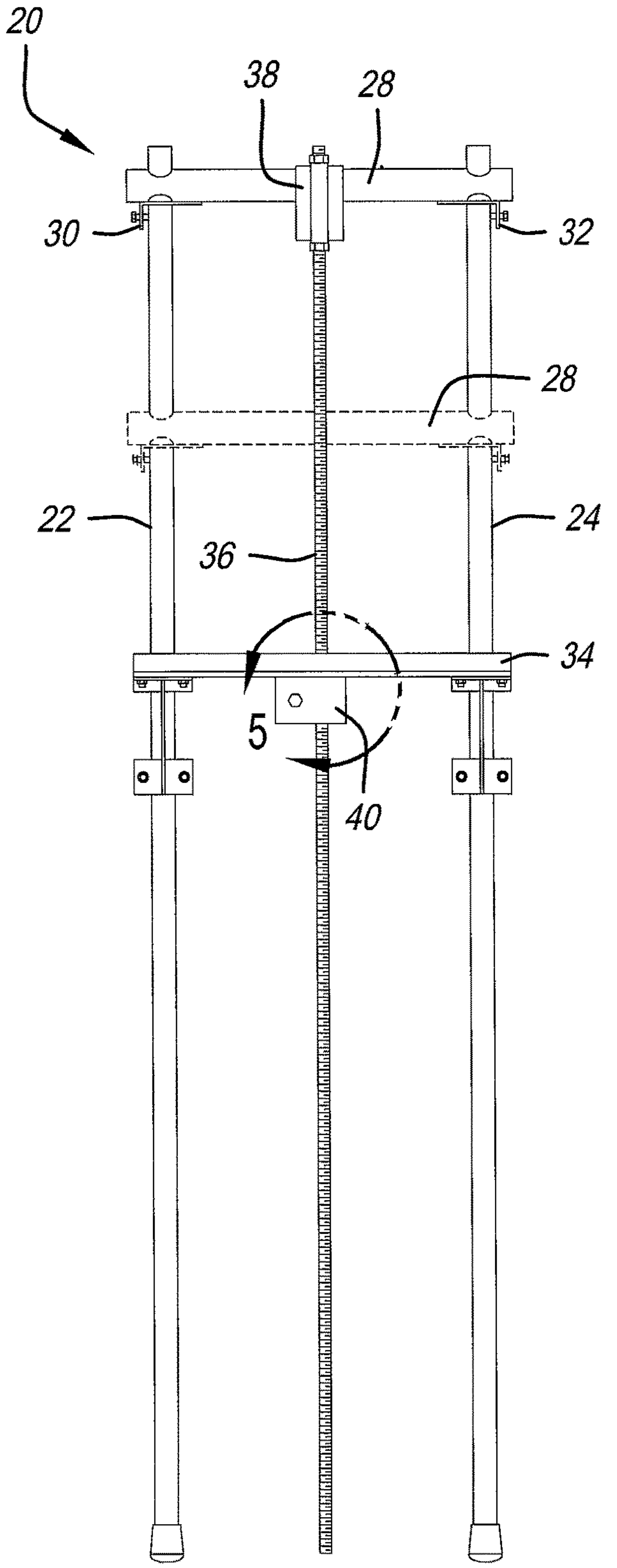
FIG. 3 is an enlarged front elevation view of the installation tool.
Figure 5:
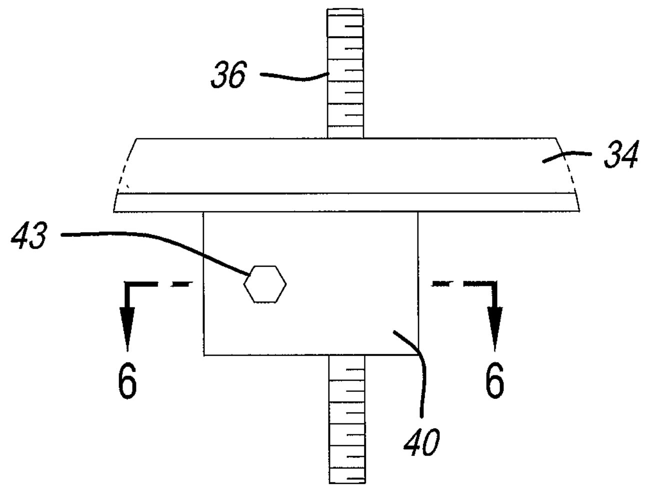
FIG. 5 is an enlarged view of area 5 of FIG. 3.
Figure 6:
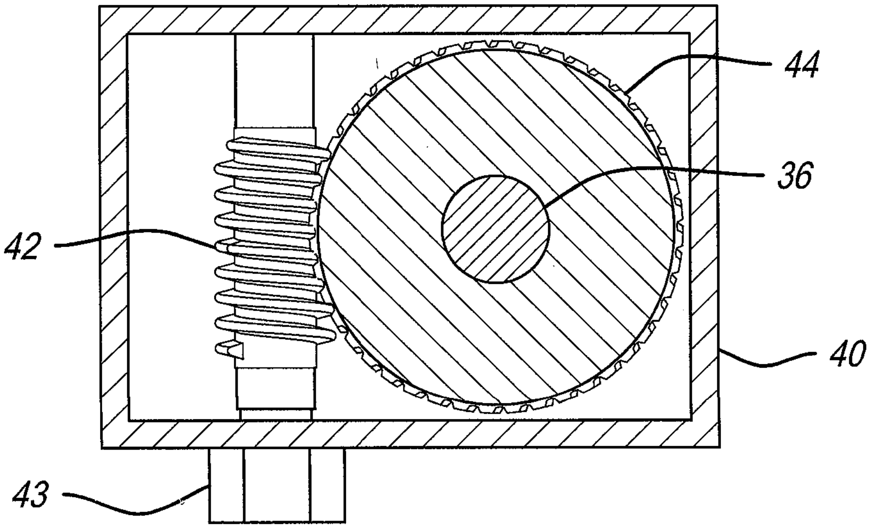
FIG. 6 is an enlarged cross-sectional view along the line 6-6 of FIG. 5.

FIG. 5 is an enlarged view of area 5 of FIG. 3, and FIG. 6 is an enlarged cross sectional view along the line 6-6 of FIG. 5. Lifter 40 includes a worm gear 42 which engages an internally threaded worm wheel 44 which receives threaded rod 36. As the head 43 of worm gear 42 is turned (such as by a drill motor 800, refer to FIGS. 12 and 13) worm wheel 44 turns and moves up or down along threaded rod 36. That is, the action of worm gear 42 and worm wheel 44 serve to change the direction of rotation by 90°. This is how holder 34 is moved up and down along threaded rod 36.

Figure 7:
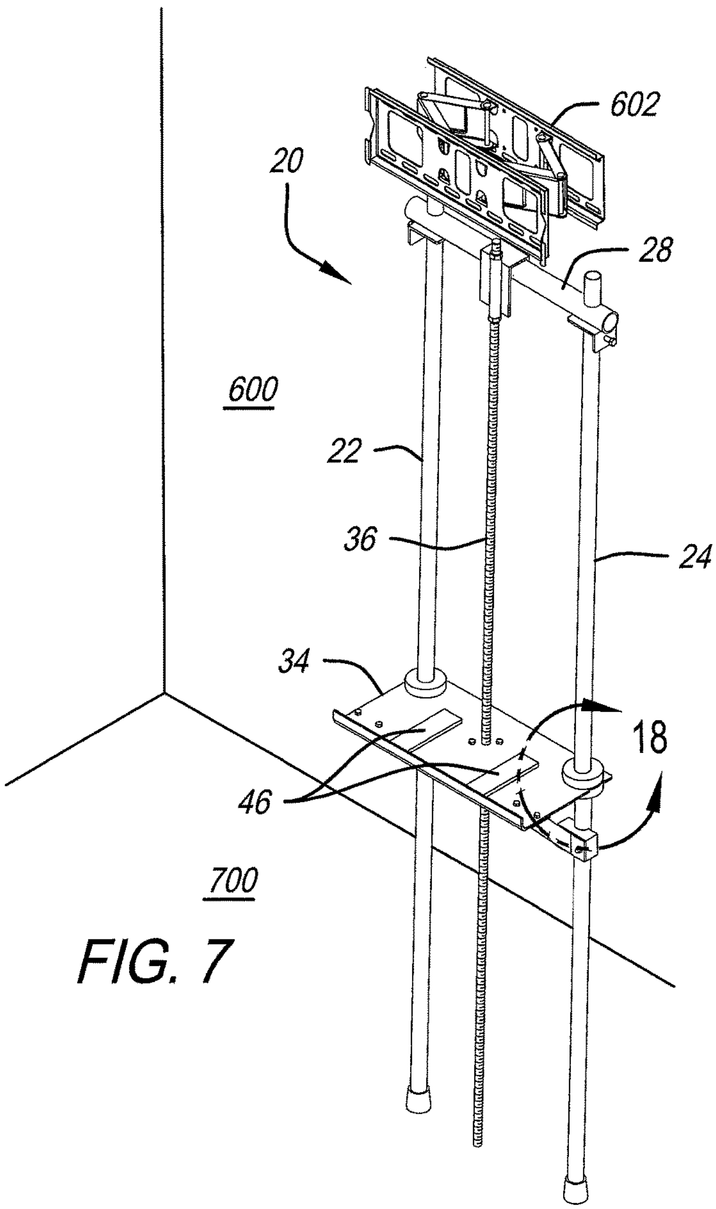
FIG. 7 is an enlarged perspective view of the installation tool placed adjacent a wall having a wall mount.
Figure 8:
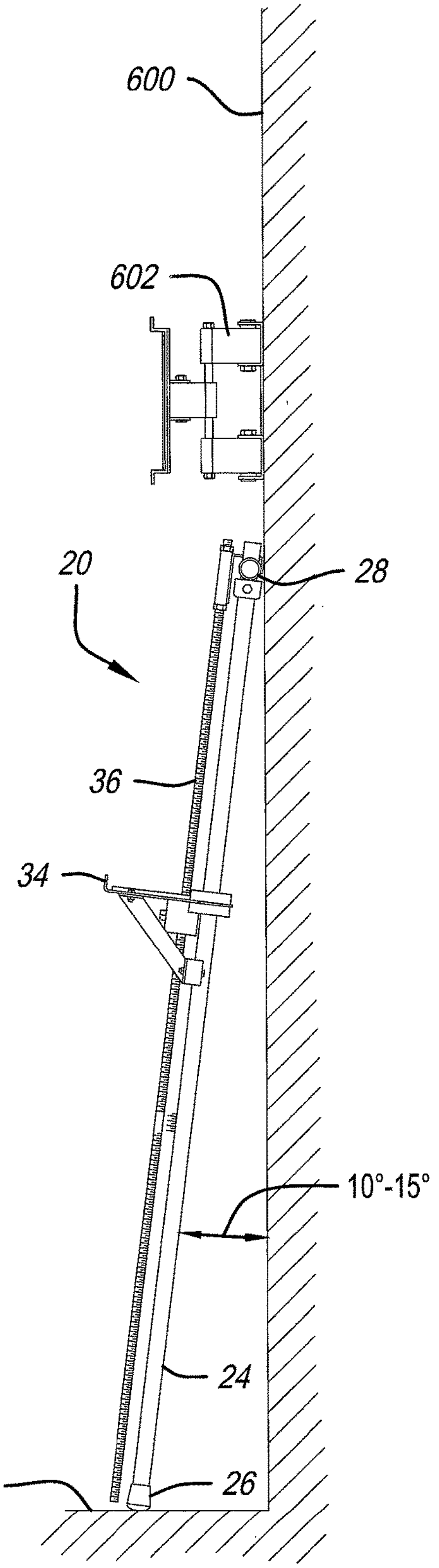
FIG. 8 is a side elevation view of FIG. 7.

FIG. 7 is an enlarged perspective view of installation tool 20 placed adjacent a wall 600 having a wall mount 602, and FIG. 8 is a side elevation view of FIG. 7. Installation tool 20 is positioned so that first leg 22 and said second leg 24 abut support surface 700 (e.g. a floor) and rest (lean) against wall 600 with crossbar 28 disposed beneath wall mount 602. In an embodiment instillation tool 20 makes an angle of about 10°-15° with wall 600. It is noted that for higher wall mount 602 installations, legs 22 and 24 can be provided with extensions (not shown). It is also noted that holder 34 is provided with anti-slip cushion 46 which abuts the bottom edge of display 500 when it is placed in holder 34 (refer to FIGS. 7 and 9).

Figure 10:
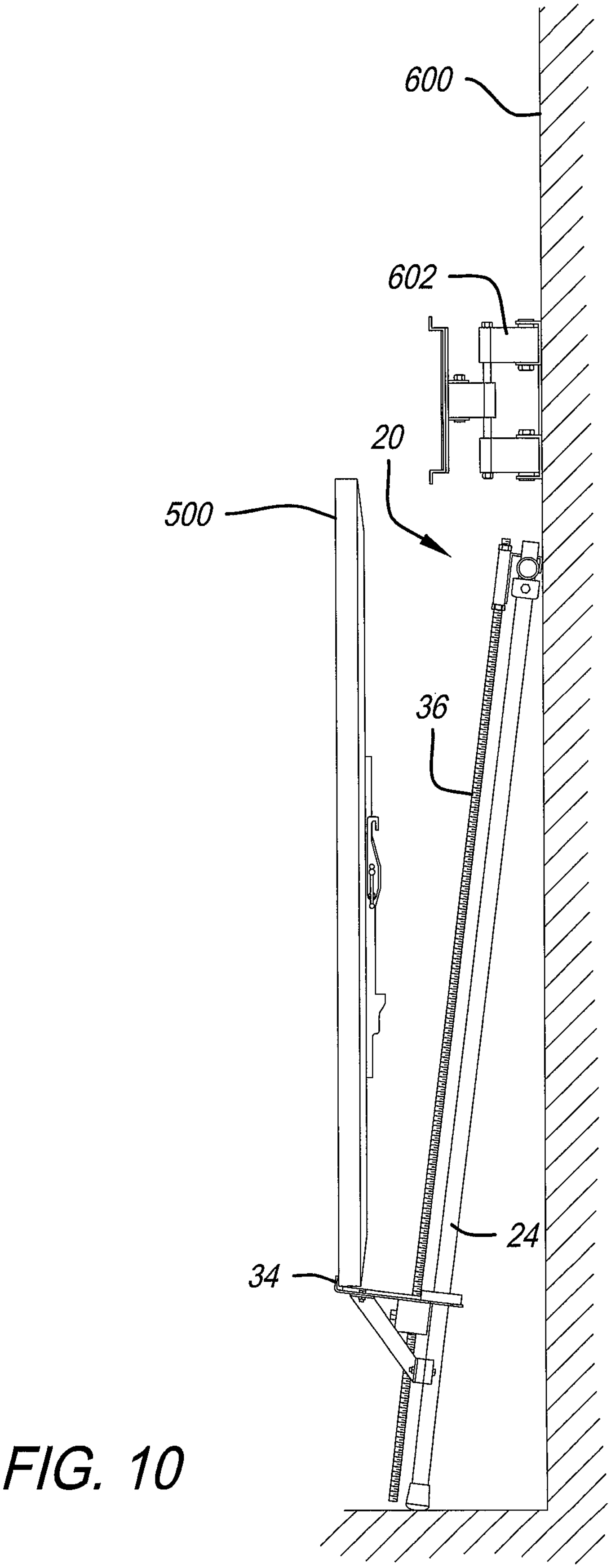
FIG. 10 is a side elevation view of FIG. 9.

FIG. 9 is an enlarged perspective view of display 500 resting in the holder 34 of installation tool 20, and FIG. 10 is a side elevation view of FIG. 9. Display 500 has been placed in holder 34 with bottom edge resting upon cushion (s) 46 (refer to FIG. 7), and approximately centered in holder 34. In this in-use configuration the weight of display 500 is borne by first 22 and second 24 legs via holder 34, threaded rod 36, connector 38, and crossbar 28.

Figure 11:
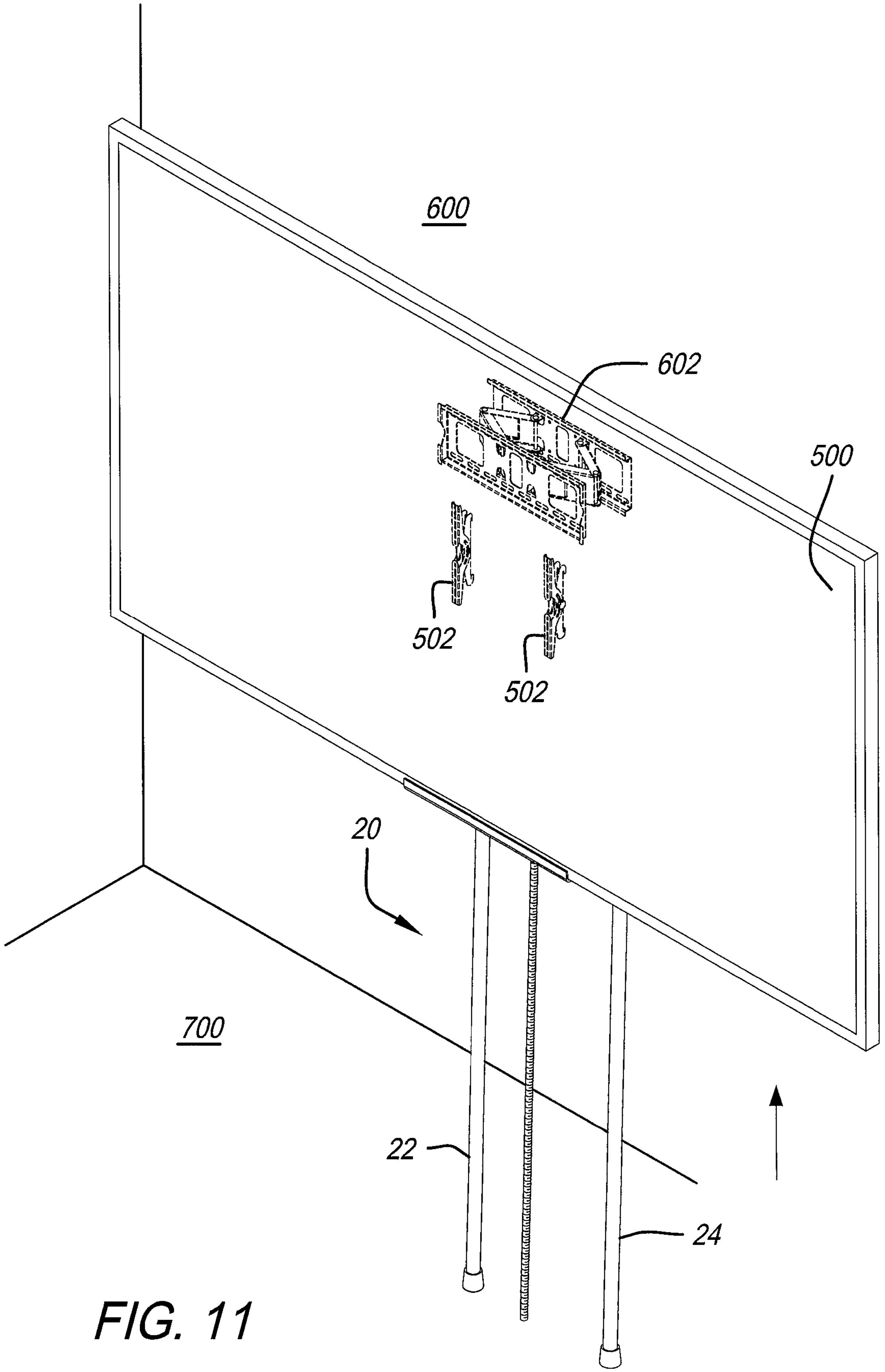
FIG. 11 is an enlarged perspective view of the display being moved upward by the installation tool.
Figure 12:
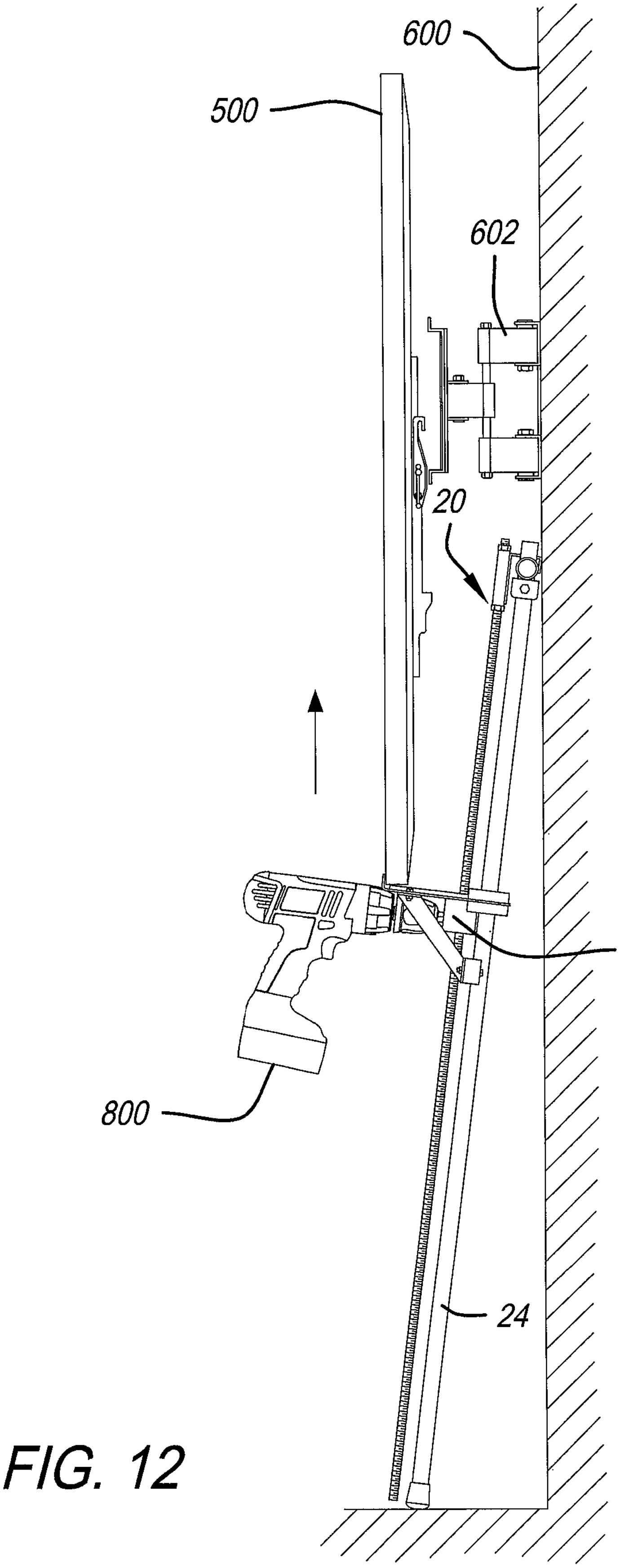
FIG. 12 is a side elevation view of FIG. 11.

FIG. 11 is an enlarged perspective view of display 500 being moved upward by installation tool 20, and FIG. 12 is a side elevation view of FIG. 11. Display 500 has a connector 502 on its back side. In the shown embodiment there are two connectors 502 which engage wall mount 602 to hold display 500 in place on wall 600 (also refer to FIGS. 13 and 14). In the shown embodiment a rotational tool 800 (such as a drill motor) engages lifter 40 and causes holder 34 and display 500 to move up along threaded rod 36 and legs 22 and 24.

Figure 13:
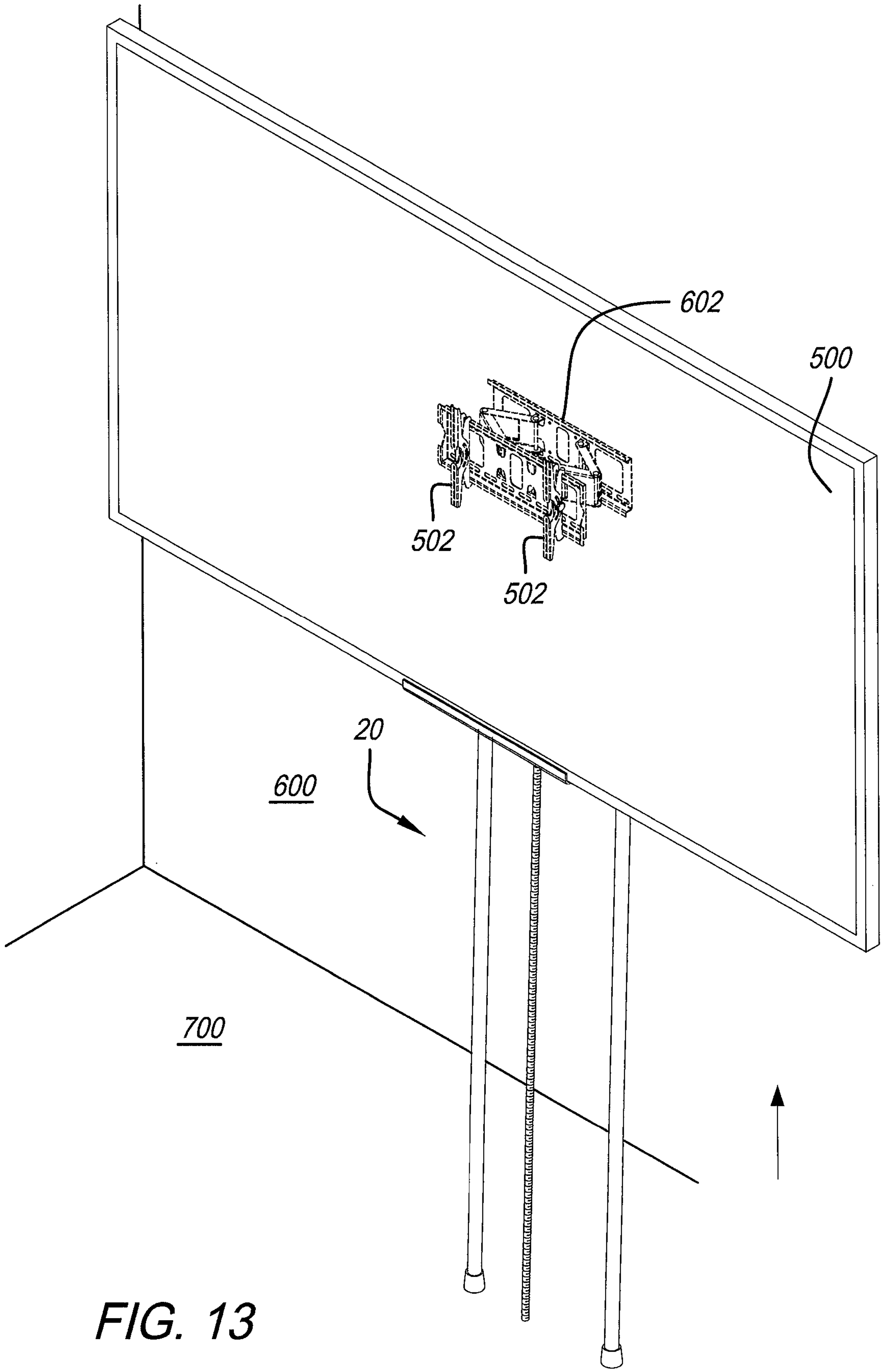
FIG. 13 is an enlarged perspective view of the display moved further upward.
Figure 14:
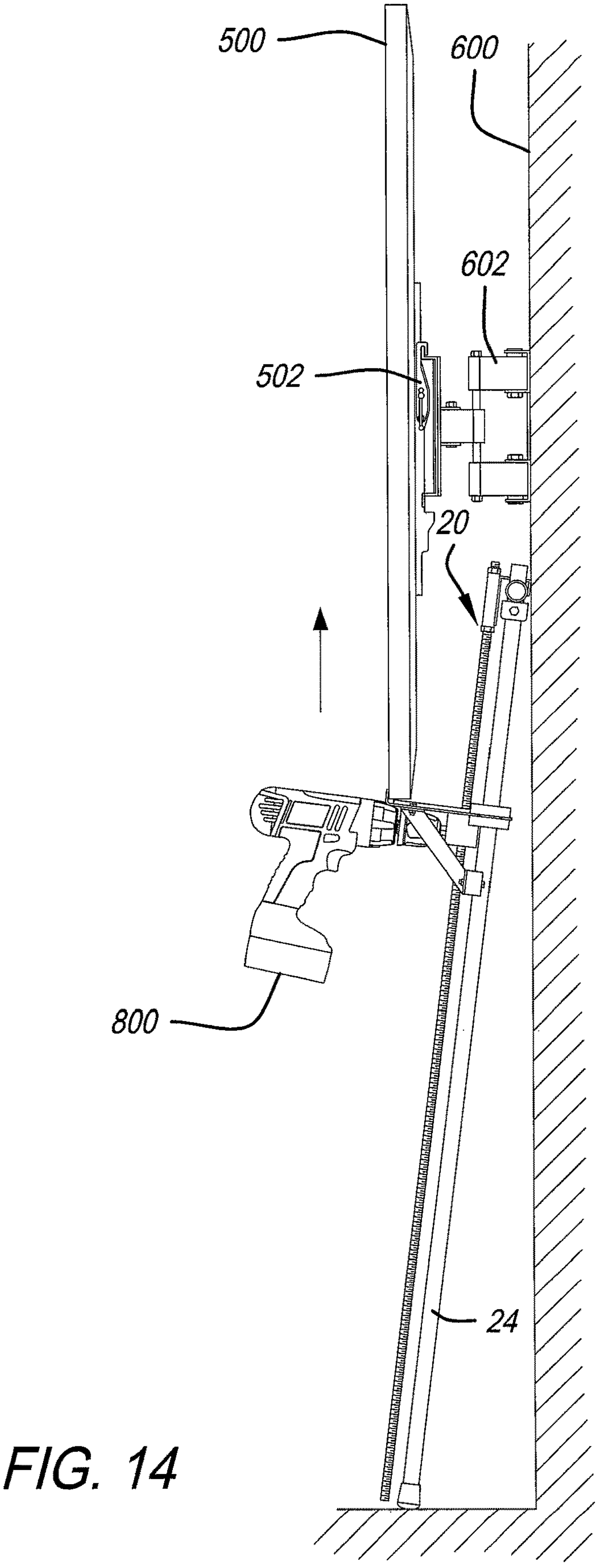
FIG. 14 is a side elevation view of FIG. 13.

FIG. 13 is an enlarged perspective view of display 500 moved further upward, and IG. 14 is a side elevation view of FIG. 13. Display 500 has now been raised to a position adjacent wall mount 602, so that connector 502 is connected to wall mount 602 and display is attached to wall 600.

Figure 15:
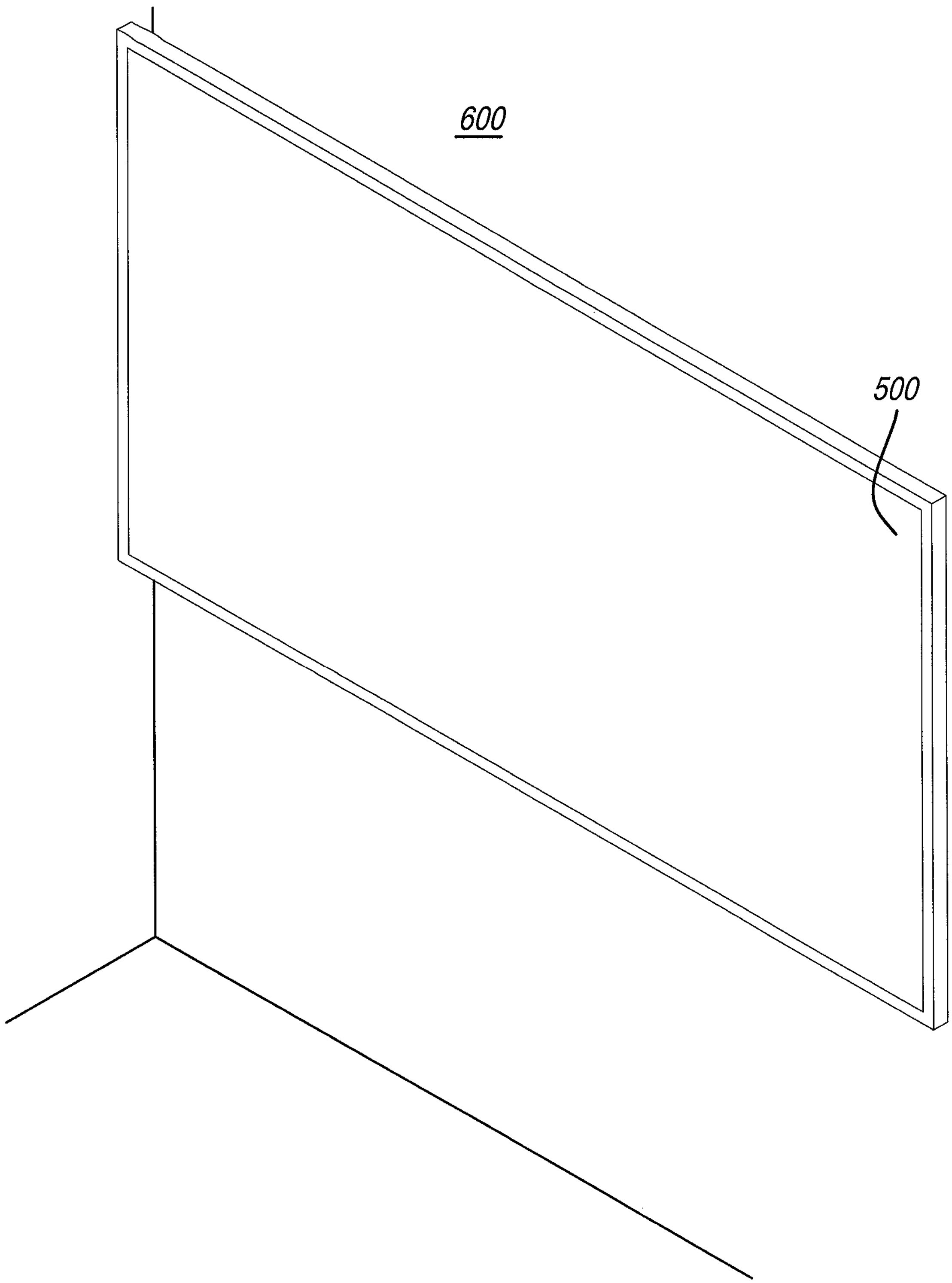
FIG. 15 is an enlarged perspective view of the display connected to the wall mount.
Figure 16:
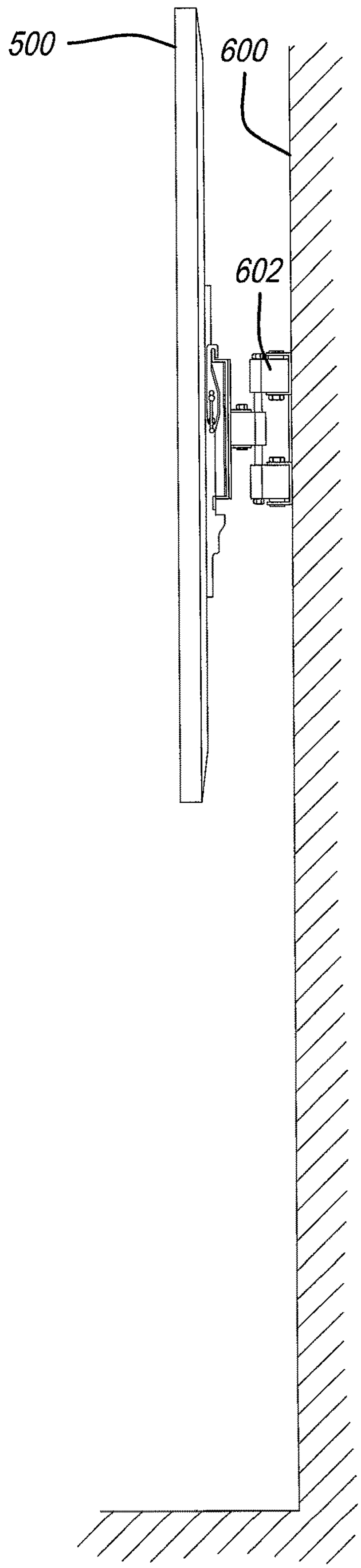
FIG. 16 is a side elevation view of FIG. 15.

FIG. 15 is an enlarged perspective view of display 500 connected to wall mount 602, and FIG. 16 is a side elevation view of FIG. 15. Articulated wall mount 602 has been pushed toward wall 600 so that display 500 is close to wall 600. Display 500 is now ready to be used. Display is now in place on wall 600 and installation tool 20 has been removed. It is noted that the installation process may be reversed, and installation tool 20 may be used to remove display 500 from wall 600. To do this installation tool is positioned so that display 500 rests in holder 34. Connector 502 is then disengaged from wall mount 602. Lifter 40 is then used to lower display 500 along threaded rod 36 and legs 22 and 24.

Figure 17:
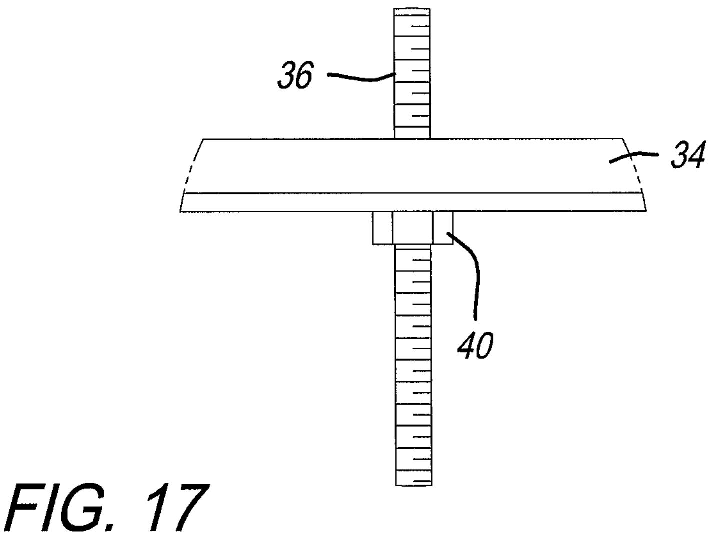
FIG. 17 is an enlarged front elevation view of another embodiment lifter.

FIG. 17 is an enlarged font elevation view of another embodiment lifter 40. In this embodiment lifter 40 is simply a nut which threadably engages threaded rod 36. As the nut is turned it forces holder 34 up along threaded rod 36.

Figure 18:
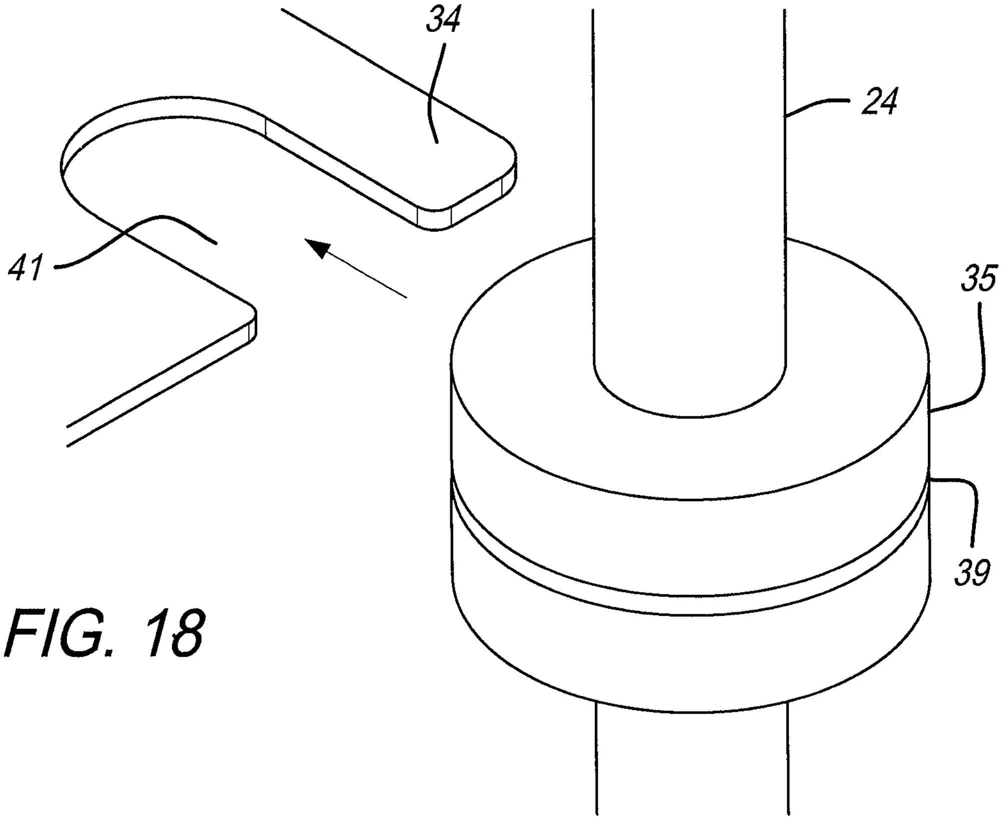
FIG. 18 is an enlarged exploded perspective view area 18 of FIG. 7.

FIG. 18 is an enlarged exploded perspective view of area 18-18 of FIG. 7. This view shows how second leg 24 is connected to holder 34. A bushing 35 is slidably connected to second leg 24. In an embodiment bushing 35 is non-metallic. Bushing 35 has a reduced diameter area 39 which is dimensioned to slidably engage a slot 41 in holder 34. This design eases the assembly of installation tool 20. It may be appreciated that the same design applies to first leg 22, bushing 35, and holder 34.

Figure 4:
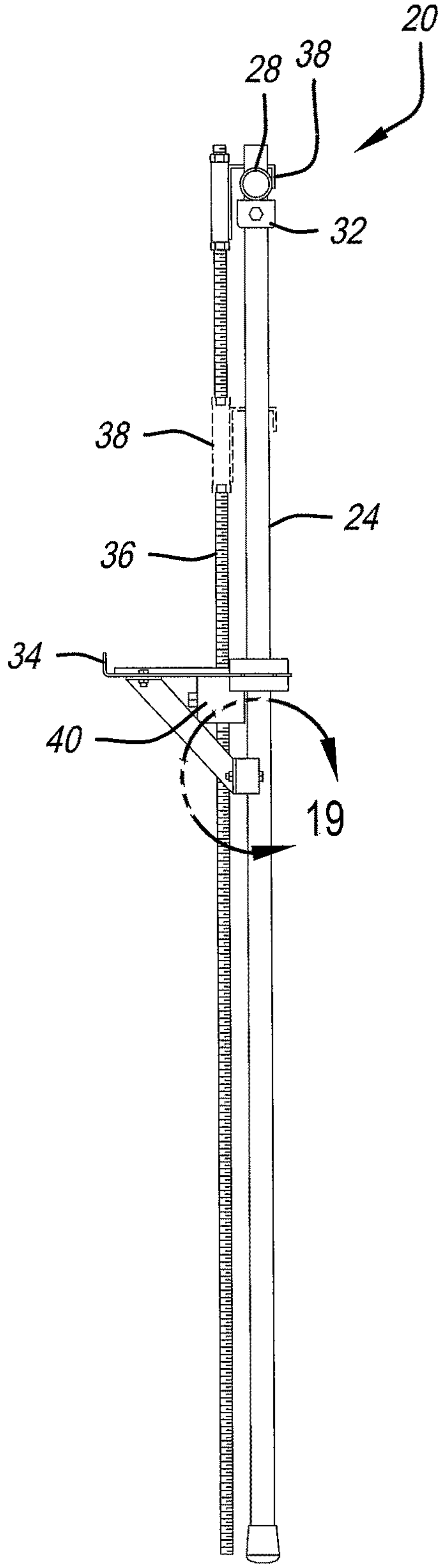
FIG. 4 is an enlarged side elevation view of the installation tool.
Figure 19:
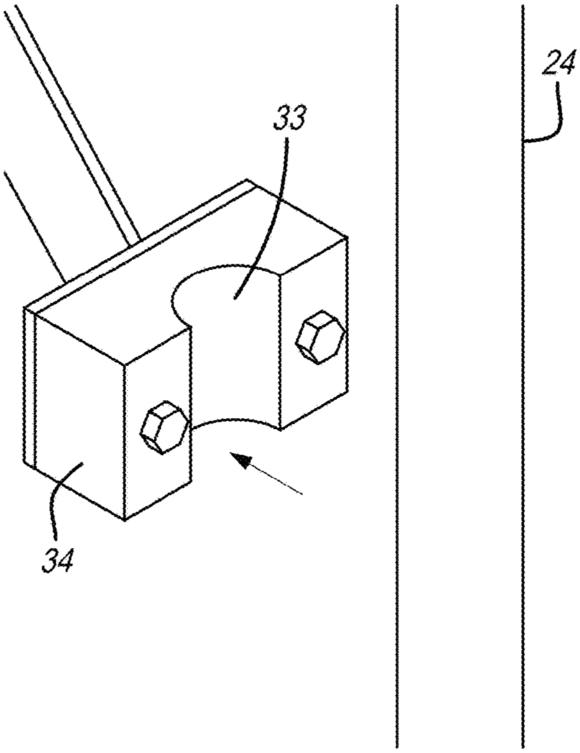
FIG. 19 is an enlarged exploded perspective view of area 19 of FIG. 4; and, FIG. 20 is an enlarged exploded perspective view of a first semicircular groove.
Figure 20:
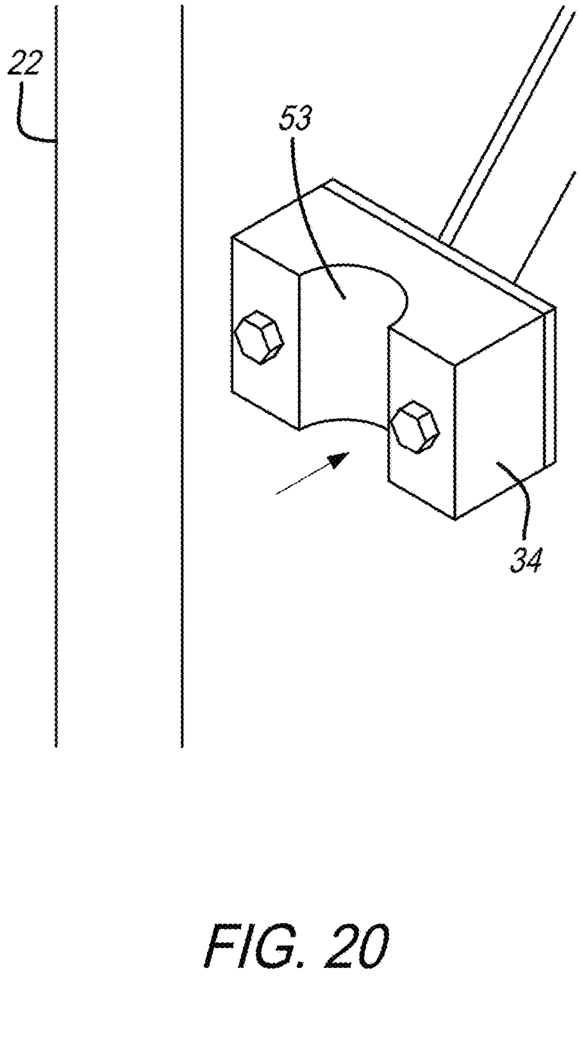

FIG. 19 is an enlarged exploded perspective view of area 19-19 of FIG. 4. Holder 34. Holder 34 has a second semicircular grove 33 which is shaped and dimensioned to receive second leg 24. And, holder 34 also has a first semicircular groove 53 shown in FIG. 20 which Is shaped and dimensioned to receive first leg 22. That is, first 22 and second 24 legs are not connected to holder by a through hole, but rather only rest against the back side of holder 34. This design simplifies the assembly of installation tool 20, while also keeping the legs aligned.

It may be appreciated that installation tool 20 may be combined with display 500, and wall mount 602 mounted on wall 600 to form a display installation system.

In terms of use, a display installation method includes: (refer to FIGS. 1-19)

(a) providing a display 500 having a weight;
(b) providing a wall 600 and a support surface 700;
(c) providing a wall mount 602 configured to connect the display 500 to the wall 600;
(d) providing an installation tool 20 for the display 500 including;
 a first leg 22;
 a second leg 24 disposed in parallel relationship with the first leg 22;
 a crossbar 28 slidably connected to the first leg 22 and the second leg 24;
 a holder 34 configured to accept the display 500, the holder 500 slidably connected to the first leg 22 and the second leg 24;
 a threaded rod 36;
 a connector 38 connected to the threaded rod 36, the connector 38 engaging the cross bar 28; and,
 a lifter 40 configured to lift holder 34, the lifter 40 positionable along the threaded rod 36;
(e) connecting the wall mount 602 to the wall;
(f) positioning the installation tool 20 so that the first leg 22 and the second leg 24 abut the support surface 700 and rest against the wall 600 with the crossbar 28 disposed beneath the wall mount 602;
(g) placing the display 500 in the holder 34;
(h) using the lifter 40 to raise the display 500 to a position adjacent the wall mount 602; and,
(i) connecting the display 500 to the wall mount 602.

The display installation method further including:
in (g), the weight of the display 500 being borne by the first leg 22 and the second leg 24.

The display instillation method further including:
in (d) a first stop 30 slidably connected to the first leg 22, the first stop 30 abutting the crossbar 28 and limiting downward motion thereof;
in (d) a second stop 32 slidably connected to the second leg 24, the second stop 32 abutting the crossbar 28 and limiting downward motion thereof; and,
in (f), adjusting the position of the first stop 30 and the second stop 32 so that the crossbar 28 is disposed beneath the wall mount 602.

The display installation method further including:
in (d), the holder 34 including a cushion 46 configured to abut the display 500; and,
in (g), resting the display 500 on the cushion 46.

The display installation method further including:
providing a rotational tool 800;
in (d), the lifter 40 including a worm gear 42 which engages an internally threaded worm wheel 44 which receives the threaded rod 36; and,
in (h), using the rotational tool 800 to rotate the worm gear 42 and position the holder 34 along the threaded rod 36.

The embodiments of the installation tool for a display and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the installation tool and method should be construed as limiting the invention to a particular embodiment or combination of embodiments. The scope of the invention is defined by the appended claims.

I claim:

1. An installation tool for a display, the display connectable to a wall mount which is connected to a wall, the installation tool comprising:
a first leg;
a second leg disposed in parallel relationship with said first leg;
a crossbar slidably connected to said first leg and said second leg;
a holder configured to accept the display, said holder slidably connected to said first leg and said second leg;
a threaded rod;
a connector connected to said threaded rod, said connector engaging said cross bar;
a lifter configured to lift said holder, said lifter positionable along said threaded rod;
a first stop slidably connected to said first leg, said first stop abutting said crossbar and limiting downward motion thereof; and,
a second stop slidably connected to said second leg, said second stop abutting said crossbar and limiting downward motion thereof.

2. The installation tool according to claim 1, the display having a weight, the installation tool further including:
an in-use configuration in which the weight of the display is borne by said first leg and said second leg.

3. The installation tool according to claim 1 further including:
said connector positionable along said threaded rod.

4. The installation tool according to claim 1 further including:
said holder including a cushion configured to abut the display.

5. The installation tool according to claim 1, further including:
said lifter including a worm gear which engages an internally threaded worm wheel which receives said threaded rod.

6. An installation tool for a display, the display connectable to a wall mount which is connected to a wall, the installation tool comprising:
a first leg;
a second leg disposed in parallel relationship with said first leg;
a crossbar slidably connected to said first leg and said second leg;
a holder configured to accept the display, said holder slidably connected to said first leg and said second leg;
a threaded rod;
a connector connected to said threaded rod, said connector engaging said cross bar;

a lifter configured to lift said holder, said lifter positionable along said threaded rod;
said holder having a first semicircular groove which is shaped and dimensioned to receive said first leg; and,
said holder having a second semicircular groove which is shaped and dimensioned to receive said second leg.

7. The installation tool according to claim 1, the display having a weight, the installation tool further including:
an in-use configuration in which the weight of the display is borne by said first leg and said second leg;
said connector positionable along said threaded rod;
said holder including a cushion configured to abut the display;
said lifter including a worm gear which engages an internally threaded worm wheel which receives said threaded rod;
said holder having a first semicircular groove which is shaped and dimensioned to receive said first leg; and,
said holder having a second semicircular groove which is shaped and dimensioned to receive said second leg.

8. A display installation system comprising:
a wall having a wall mount;
a display;
an installation tool for said display including;
a first leg;
a second leg disposed in parallel relationship with said first leg;
a crossbar slidably connected to said first leg and said second leg;
a holder configured to accept said display, said holder slidably connected to said first leg and said second leg;
a threaded rod;
a connector connected to said threaded rod, said connector engaging said cross bar;
a lifter configured to lift said holder, said lifter positionable along said threaded rod;
a first stop slidably connected to said first leg, said first stop abutting said crossbar and limiting downward motion thereof; and,
a second stop slidably connected to said second leg, said second stop abutting said crossbar and limiting downward motion thereof.

9. The display installation system according to claim 8 further including:
said display having a weight; and,
an in-use configuration in which said the weight of said display is borne by said first leg and said second leg.

10. The display installation system according to claim 8 further including:
said connector positionable along said threaded rod.

11. The display installation system according to claim 8 further including:
said holder including a cushion configured to abut said display.

12. The display installation system according to claim 8 further including:
said lifter including a worm gear which engages an internally threaded worm wheel which receives said threaded rod.

13. The display installation tool according to claim 8, further including:
said holder having a first semicircular groove which is shaped and dimensioned to receive said first leg; and,
said holder having a second semicircular groove which is shaped and dimensioned to receive said second leg.

14. A display installation method comprising:
(a) providing a display having a weight;
(b) providing a wall and a floor;
(c) providing a wall mount configured to connect said display to said wall;
(d) providing an installation tool for said display including;
a first leg;
a second leg disposed in parallel relationship with said first leg;
a crossbar slidably connected to said first leg and said second leg;
a holder configured to accept the display, said holder slidably connected to said first leg and said second leg;
a threaded rod;
a connector connected to said threaded rod, said connector engaging said cross bar;
a lifter configured to lift said holder, said lifter positionable along said threaded rod;
a first stop slidably connected to said first leg, said first stop abutting said crossbar and limiting downward motion thereof;
a second stop slidably connected to said second leg, said second stop abutting said crossbar and limiting downward motion thereof;
(e) connecting said wall mount to said wall;
(f) positioning said installation tool so that said first leg and said second leg abut said floor and rest against said wall with said crossbar disposed beneath said wall mount;
(g) placing said display in said holder;
(h) using said lifter to raise said display to a position adjacent said wall mount; and,
(i) connecting said display to said wall mount.

15. The display installation method according to claim 14, further including:
in (g), said the weight of said display being borne by said first leg and said second leg.

16. The display instillation method according to claim 14, further including:
in (f), adjusting the position of said first stop and said second stop so that said crossbar is disposed beneath said wall mount.

17. The display installation method according to claim 14 further including:
in (d), said holder including a cushion which is configured to abut said display; and,
in (g), resting said display on said cushion.

18. The display installation method according to claim 14 further including:
providing a rotational tool;
in (d), said lifter including a worm gear which engages an internally threaded worm wheel which receives said threaded rod; and,
in (h), using said rotational tool to rotate said worm gear and position said holder along said threaded rod.

* * * * *